US011696528B2

(12) United States Patent
Hodson

(10) Patent No.: US 11,696,528 B2
(45) Date of Patent: Jul. 11, 2023

(54) SETTINGS PROPAGATION AND SYNCHRONIZATION ACROSS MOBILE WORK MACHINES

(71) Applicant: Deere & Company, Moline, IL (US)

(72) Inventor: Michael J. Hodson, Silvis, IL (US)

(73) Assignee: Deere & Company, Moline, IL (US)

( * ) Notice: Subject to any disclaimer, the term of this patent is extended or adjusted under 35 U.S.C. 154(b) by 478 days.

(21) Appl. No.: 16/599,320

(22) Filed: Oct. 11, 2019

(65) Prior Publication Data

US 2021/0105940 A1 Apr. 15, 2021

(51) Int. Cl.
*A01D 41/127* (2006.01)
*G06F 16/27* (2019.01)
*G05B 21/02* (2006.01)

(52) U.S. Cl.
CPC .......... *A01D 41/127* (2013.01); *G05B 21/02* (2013.01); *G06F 16/275* (2019.01)

(58) Field of Classification Search
None
See application file for complete search history.

(56) References Cited

U.S. PATENT DOCUMENTS

| | | | | |
|---|---|---|---|---|
| 6,845,378 B1 * | 1/2005 | Pauly | ...................... | G06F 16/25 |
| 7,756,623 B2 * | 7/2010 | Jarrett | ..................... | A01B 63/00 |
| | | | | 701/50 |
| 2004/0024510 A1 * | 2/2004 | Finley | .................. | G05B 19/042 |
| | | | | 701/50 |
| 2015/0088907 A1 * | 3/2015 | Li | .......................... | G16H 10/60 |
| | | | | 707/749 |
| 2017/0083026 A1 * | 3/2017 | Schmidt | ............... | A01B 69/008 |
| 2017/0090741 A1 | 3/2017 | Tentinger et al. | | |
| 2017/0200393 A1 * | 7/2017 | Ferrari | ................. | A01B 79/005 |
| 2018/0095441 A1 * | 4/2018 | Nakagawa | ............. | G05B 21/02 |
| 2019/0085785 A1 * | 3/2019 | Abolt | ..................... | G06Q 20/02 |
| 2019/0104674 A1 * | 4/2019 | Sawaki | ................... | H04L 67/12 |

FOREIGN PATENT DOCUMENTS

| | | | |
|---|---|---|---|
| EP | 3192344 A1 | 7/2017 | |
| EP | 3757934 A1 | 12/2020 | |
| JP | 2019071007 A | 5/2019 | |
| WO | WO-2015042540 A1 * | 3/2015 | ......... G06F 13/4027 |

OTHER PUBLICATIONS

European Search Report issued in counterpart application No. 20196742.9 dated Feb. 16, 2021 (09 pages).

* cited by examiner

*Primary Examiner* — Jelani A Smith
*Assistant Examiner* — Jacob Daniel Underbakke
(74) *Attorney, Agent, or Firm* — Joseph R. Kelly; Kelly, Holt & Christenson PLLC

(57) ABSTRACT

A data propagation system stores operator/machine/implement combinations, and corresponding settings data indicative of settings on the machine or implement for the corresponding combination. When a machine is connected to an implement, an identity of an operator is detected, along with an identity of the machine and an identity of the implement. The data propagation system determines whether settings data is available for that operator/machine/implement combination. If so, the settings data is obtained and the machine and implement are automatically controlled based upon the retrieved settings data.

20 Claims, 10 Drawing Sheets

SETTINGS PROPAGATION AND SYNCHRONIZATION ACROSS MOBILE WORK MACHINES

FIELD OF THE DESCRIPTION

The present description relates to controlling equipment. More specifically, the present description relates to synchronizing settings data and controlling work machines and work implements based upon the synchronized settings data for known combinations of machines, implements and operators.

BACKGROUND

There are a wide variety of different types of machines. Such machines can include agricultural machines, construction machines, forestry machines, among a wide variety of others. Some such machines can be attached to one or more different implements.

The machines and implements can be configurable, or otherwise controlled using various different settings. Different operators may configure or setup the machines differently, depending on the particular type of machine that they are operating, and depending upon the particular implement, or type of implement, that is being connected to the machine.

As an example, there may be a plurality of different types of combine harvesters that can each be operated by one of a number of different operators. Also, each of those different combine harvesters may be attachable to a number of different implements, such as headers. The combine harvesters may be of the same type (e.g., the same size, horse power, model number, etc.). However, they may also be of different types. Similarly, in a fleet of machines, there may be a plurality of different combine harvesters of one type, and a plurality of different types of combine harvesters of other types. The same is true of the headers. The headers can be different types of headers, different size headers, etc.

A particular user may set settings on a combine harvester at one value, when it is a combine harvester of a first type, and when it is attached to an implement of a first type. However, that same operator may set the settings to different values when the same combine harvester is attached to a different type of implement, or when that same operator is operating a different combine harvester.

It can be time consuming and error prone for an operator to set the settings values for the different combinations of combine harvesters and implements that the operator is using. For example, each time the operator begins operating a combine harvester with an implement, the operator must often set the settings values to the desired level. However, when the operator then moves to a different combine harvester, or uses the same combine harvester but connects it to a different implement, the operator must often then change the settings values. This problem can be exacerbated when there is a fleet of combine harvesters, each of which can be attached to a plurality of different implements, and each of which can be operated by a different operator.

The discussion above is merely provided for general background information and is not intended to be used as an aid in determining the scope of the claimed subject matter.

SUMMARY

A data propagation system stores combination records that have operator/machine/implement combinations, and corresponding settings data indicative of settings on the machine or implement for the corresponding combination. When a machine is connected to an implement, the combination records are synchronized between the machine and the implement. Then, an identity of an operator is detected, along with an identity of the machine and an identity of the implement. The data propagation system determines whether settings data is available for that operator/machine/implement combination. If so, the settings data is obtained and the machine and implement are automatically controlled based upon the retrieved settings data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it can be cumbersome and time consuming (as well as error prone) for an operator to re-enter settings values each time the operator begins operating a machine, that is connected to an implement. Similarly, when the operator changes implements, or changes machines, it is even more cumbersome and time consuming for the operator to have to re-enter settings values for the new machine and/or the new implement.

Currently, in order to address this, some machines have memory that saves implement configuration data indicating how an implement was configured when it was attached to the machine. This configuration data, however, has only been stored for generic categories of implements. This data does not track which specific implement was connected, but only a generic type of implement. Nor does it track which user did the configuring. Similarly, implements currently do not track how they are configured when attached to various machine forms, or individual machines.

The present description thus proceeds with respect to a system that enables machines and implements to detect and remember how a specific user configured them to work with one another. It also facilitates transfer of that configuration data to new machines or implements, when they are attached to one another in the future.

By way of example, some current combine harvester will detect that a draper head has been attached, and they will detect and store the stop height that has been set for the draper head. However, this data is stored and subsequently used for all generic "draper heads". Draper heads, however, are not all the same. Some may be different sizes, or different models. Also, they can be used differently. In addition, it may be that an operator wishes to use one type of draper head for harvesting a first type of crop (e.g., soybeans) but another type of draper head when harvesting a different type of crop (e.g., wheat). In this example, the present discussion proceeds with respect to a system detects and stores the combination of which particular draper head is being used, which machine it is attached to, and which operator is operating that machine. Along with this combination record, it stores settings indicative of how the draper head and machine are configured during operation.

Figure 1:
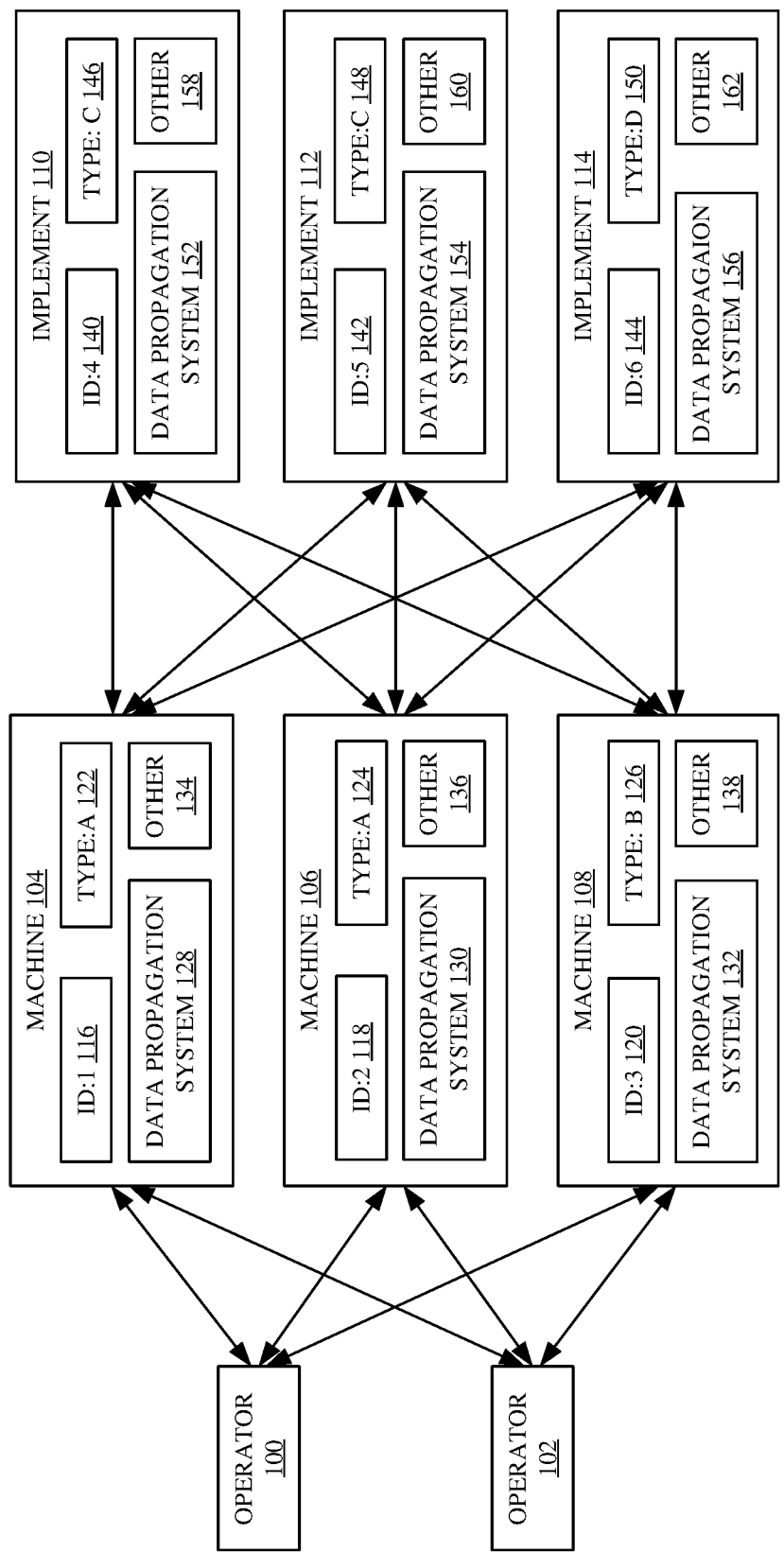
FIG. 1 is a block diagram showing one example of a plurality of different combinations of operators, machines and implements.

FIG. 1 is a block diagram showing one example of a plurality of different machines that can be operated by a plurality of different operators, and that can each be attached to one of a number of different implements. It will be noted that the system can be scaled upward or downward. For instance, the present discussion could be scaled up to a system in which each machine can be simultaneously coupled to multiple different implements. Similarly, the present discussion can be scaled down to a system that considers only machine/implement pairs, operator/machine pairs, etc. The present discussion proceeds with respect to a system that considers operator/machine/implement combinations by way of example only. FIG. 1 thus shows that two different operators 100, 102 can operate any of a variety of different machines 104, 106, 108, each of which can be attached to one of a plurality of different implements 110, 112 and 114. Each of the machines 104-108 is illustratively uniquely identified by a unique identifier 116, 118 and 120, respectively. The machines 104-108 may be of the same type or different types. For instance, they may all be a particular model of combine harvester, or the machines may be different models of combine harvesters. Thus, each machine 104-108 has a type identifier 122, 124 and 126, respectively. It can be seen in FIG. 1 that machines 104 and 106 are of the same type, while machine 108 is of a different type.

FIG. 1 also shows that each machine 104-108 illustratively has a data propagation system 128, 130 and 132, respectively. The machines 104-108 can also each have a variety of other different types of machine functionality 134, 136 and 138, respectively.

FIG. 1 also shows that each different implement 110, 112 and 114 illustratively has a unique identifier 140, 142 and 144 that uniquely identifies each implement 110, 112 and 114, relative to the other implements. Each of the implements can be of the same type, or of a different type. For instance, where machines 104-108 are combine harvesters, implements 110-114 may be draper heads of the same model, or different models. Thus, each implement has a type identifier 146, 148 and 150 that identifies the type of the corresponding implement 110, 112 and 114.

In FIG. 1, each of the implements 110, 112 and 114 also illustratively has a corresponding data propagation system 152, 154 and 156, respectively. The implements 110, 112 and 114 can have a wide variety of other functionality as well. This is indicated by blocks 158, 160 and 162, respectively.

As illustrated by the various arrows in FIG. 1, the example illustrates that operator 100 can operate any of the machines 104, 106 and 108. Each of those machines can be connected to any of the implements 110, 112 and 114. Thus, when operator 100 is operating machine 104, which is connected to implement 110, then operator 100 may configure the machine 104 and/or implement 110 in one way. However, if operator 100 is operating a different machine (e.g., machine 108), even if machine 108 is attached to implement 110, operator 100 may configure machine 108 and implement 110 differently than when machine 104 was connected to implement 110.

For example, assume that operator 100 is now operating machine 108 (which has a different type 126 than machine 104). Further assume that machine 108 is attached to implement 110. Even though operator 100 has a machine 108 that is attached to implement 110, operator 100 may configure machine 108 and/or implement 110 differently, because machine 108 is different than machine 104 (as indicated by the unique identifiers 116 and 120), and it is also a different type of machine (e.g., a different model, etc.) as indicated by type identifiers 122 and 126.

Similarly, different operators may configure the same machine/implement combination differently from one another. For example, it may be that operator 102 operates machine 104, when it is connected to implement 110. However, operator 102 may configure the machine 104 and/or implement 110 differently than operator 100 did, when operator 100 was operating that same machine/implement combination. This may be because of different preferences or experience levels or for other reasons.

As yet another example, assume that operator 100 is now operating machine 106, which is attached to implement 112. It can be seen that machine 106 is the same type of machine as machine 104, as indicated by type indicators 122 and 124. It can also be seen that implement 112 is the same type of implement as implement 110, as indicated by type indicators 146 and 148. In that case, even though operator 100 has never operated the machine 106/implement 112 combination before, it may be that operator 100 would configure machine 106 and implement 112 in the same way as operator 100 configured machine 104 and implement 110, when operator 100 operated that combination.

Therefore, the data propagation systems shown in FIG. 1 keep track of the various different operator/machine/implement combinations that have been used. They also keep track of the configuration or settings data indicative of how the machine and implement are set and configured with each of those particular operator/machine/implement combinations. The data propagation systems propagate all of the combinations that they are storing, to other machines and implements, when they are connected. For instance, assume that data propagation system 128 on machine 124 has a set of operator/machine/implement data. Assume also that data propagation system 152 in implement 110 has a set of operator/machine/implement combination data. Then, when machine 104 is connected to implement 110, data propagation system 128 and data propagation system 152 synchronize their sets of operator/machine/implement combination data so that each data propagation system 128 and 152 has a superset of all the combination data that was previously stored on either data propagation system 128 and 152. Also, where one of the data propagation systems has an older record (with older operator/machine/implement combination data) and another propagation system has a newer record for the same combination, the synchronization may update the older record with the newer one.

Assume now that machine 104 is connected to implement 112. In that case, data propagation system 128 and data propagation system 154 synchronize all of their operator/machine/implement combination data. Thus, data propagation system 154 on implement 112 will now include all of the operator/machine/implement combination data that machine 104 previously synchronized with implement 110. Data propagation system 128 will now also include not only the data it had after synchronizing with data propagation system 152, but it will have additional data that is synchronized from data propagation system 154. In this way, each time a machine 104, 106, 108 is attached to an implement 110, 112, 114, all of the operator/machine/implement combination data that is being stored by either the machine or the implement is synchronized to the other so that both contain a full set (e.g., a superset of the combination data contained on both machines).

Figure 2:
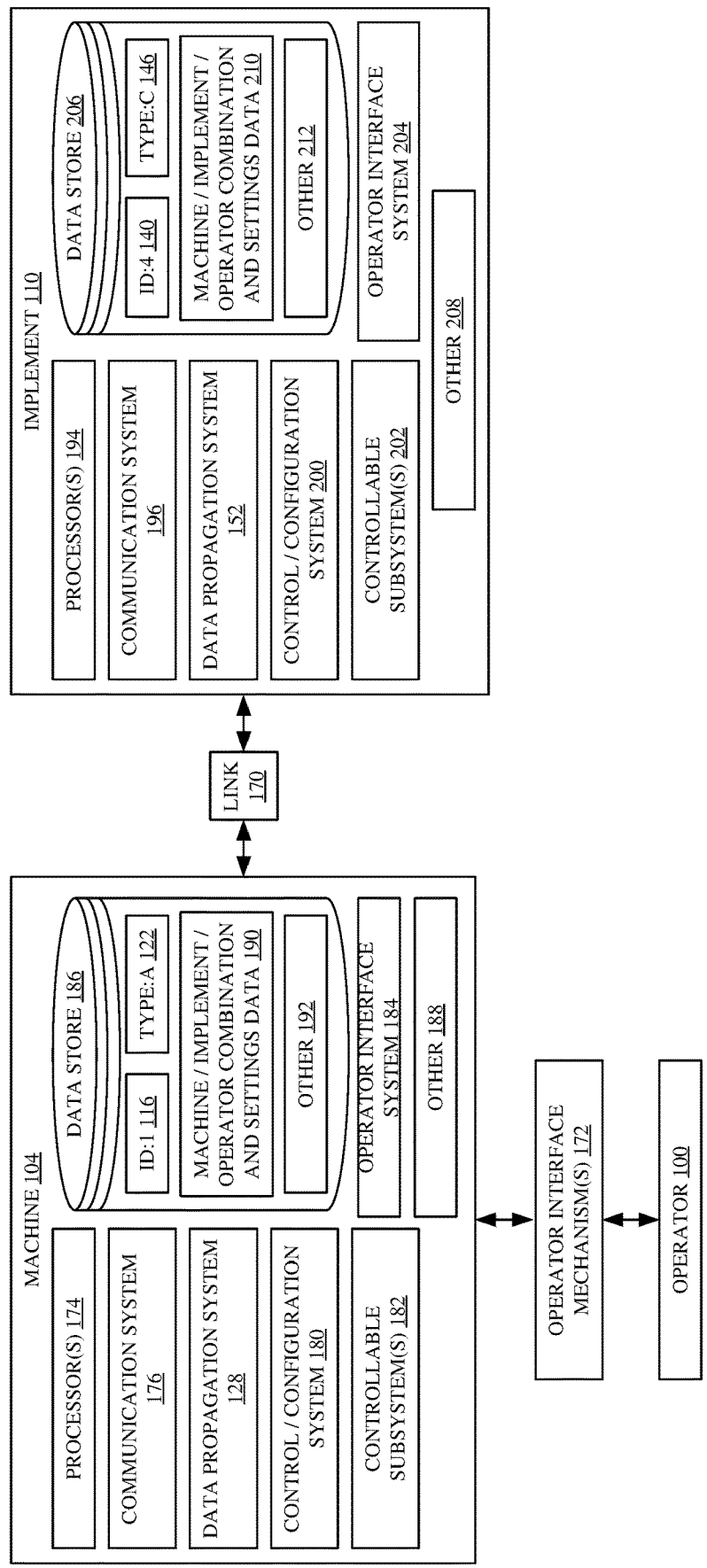
FIG. 2 is a block diagram showing one example of a machine and an implement in more detail.

FIG. 2 is a block diagram showing one example of a machine (in the example illustrated in FIG. 2 it is machine 104 from FIG. 1), coupled to an implement (in the example illustrated in FIG. 2 the implement is implement 110 from FIG. 1). The machine 104 is coupled to implement 110 over a link 170. Link 170 can include a mechanical link so that machine 104 mechanically supports implement 110. The mechanical link can be a set of linkages by which machine 104 supports implement 110, or it can be a tow bar with which machine 104 tows implement 110, or it can be another type of mechanical link. Link 170 also illustratively includes a communication link so that machine 104 can control implement 110 in various ways. The communication link can be a wire assembly, a wireless communication link, or another type of communication link. In yet another example, link 170 includes a power link in which machine 104 transfers power to implement 110. The power can be, for instance, a power takeoff link, an electrical power link, a hydraulic link in which machine 104 provides hydraulic fluid under pressure to implement 110, or it can be any other type of power link. Link 170 can include other types of links as well.

FIG. 2 also shows that, in the example illustrated, operator 100 is operating machine 104 through operator interface mechanisms 172. Mechanisms 172 can include such things as levers, steering wheel, brake pedals, mechanical linkages, joysticks, touch sensitive display elements that can be controlled using touch gestures or point and click inputs, a microphone, where speech recognition is used, or a wide variety of other audio, visual and haptic mechanisms.

FIG. 2 also shows a more detailed example of machine 104 and implement 110. Before describing the operation of machine 104 and implement 110, and their corresponding data propagation systems 128 and 152, a brief discussion of some of the items on machine 104 and implement 110, and their operation, will first be provided.

Machine 104 illustratively includes one or more processors 174, communication system 176, data propagation system 178, control/configuration system 180, controllable subsystems 182, operator interface system 184, data store 186, and it can include other items 188. Data store 186 illustratively includes the unique identifier 116 and the type identifier 122, that uniquely identify machine 104 relative to other machines, and that identify the type of machine 104, respectively. Data store 186 also illustratively includes combination records 190 that include the machine/implement/operator combination and settings data. Record 190 illustratively identifies the different machine, implement and operator combinations that have been synchronized through the data propagation system 128 in machine 104, along with the settings data corresponding to those different combinations. Data store 186 can include other items 192 as well.

It will be noted that the combination records 190 on machine 104 need not necessarily identify different machines, in instances where machine 104 will not be paired with other machines. However, records 190 can include records that identify other machines, and this is the example described herein, but it is only one example.

Communication system 176 is illustratively a communication system that can facilitate communication over one or more of the various links 170 to implement 110. It also illustratively facilitates communication among the items or systems in machine 104, as well as through the operator interface mechanisms 172. Further, to the extent that machine 104 communicates information to a remote system (such as a vendor system deployed in a remote server environment, a farm manager's computing system, etc.), communication system 176 is configured to communicate in that way. Therefore, it can be a communication system that can communicate over a controller area network, over a local area network, over a wide area network, over a cellular communication network, over a satellite communication network, on a communication bus, or it can be a wide variety of other communication systems or combinations of communication systems.

Data propagation system 128 illustratively facilitates the synchronization of combination records 190 (that include the machine/implement/operator combination and settings data) with the implement 110 that it is connected to. In addition, where the information is uploaded to a remote server environment, then data propagation system 128 can be used to synchronize data to the remote server environment as well.

Control/configuration system 180 illustratively generates control signals to control various controllable subsystems 182, based upon the settings data in the various combination records 190 stored in data store 186, based upon the current machine/implement/operator combination. For instance, where operator 100 has operated machine 104 with implement 110 in the past, and the settings or configuration information that operator 100 used when that occurred, is stored as a combination record 190, then data propagation system 120 accesses that combination record 190 and provides the setting data to control/configuration system 180. System 180 generates control signals to control the various controllable subsystems 182 on machine 104 and controllable subsystems on implement 110 (described in greater detail elsewhere) so that the machine 104 and implement 110 are configured and setup the same way as they were the previous time that operator 100 operated them.

The controllable subsystems 182 can include a wide variety of different controllable subsystems. For instance, assuming that machine 104 is a combine harvester and implement 110 is a header, then the controllable subsystems 182 can be subsystems that control the height of the header, the speed of machine 104, the sieve and chaffer settings, rotor settings, separator settings, fan speed settings, among a wide variety of other settings and/or configuration data.

Operator interface system 184 illustratively generates operator interfaces that can be output on operator interface mechanisms 172 (such as visual, audio or haptic outputs). Operator interface system 184 also illustratively detects user interactions with the operator interface mechanisms 172 and provides an indication of those interactions to the other systems in machine 104. It can provide an indication of those outputs to other items (such as implement 110, remote computing systems, etc.).

In the example shown in FIG. 2, implement 110 also illustratively includes one or more processors 194, communication system 196, data propagation system 152, control/ configuration system 200, controllable subsystems 202, operator interface system 204, data store 206, and it can include other items 208. Data store 206 illustratively includes the unique identifier 140 that uniquely identifies implement 110 among various other implements, as well as the type identifier 146 that identifies the type of implement 110. Data store 206 can also illustratively include combination records 210 that have machine/implement/operator combination and corresponding settings data. This is the data that identifies the various machine/implement/operator combinations, and the corresponding settings, that have been synchronized to implement 110 by data propagation system 152. Data store 206 can also include a wide variety of other data 212 as well.

It will be noted that records 210 need not necessarily include implement data for other implements, in instances where implement 110 will not be connected to other implements. However, the present description proceeds with respect to records 210 being machine/implement/operator combination records, but this is just one example.

As with communication system 176 on machine 104, communication system 196 on implement 110 can be configured in wide variety of different types of ways, depending upon the types of communication it is to perform. It illustratively facilitates communication over link 170, and it can include a wide variety of other communication components that can communicate in other ways.

Data propagation system 152 operates in a similar fashion to data propagation system 128. Data propagation system 128 is described in more detail below with respect to FIG. 3.

Control/configuration system 200 illustratively receives settings data and may receive other information over link 170 and generates control signals based upon that information, and applies the control signals to controllable subsystems 202. The controllable subsystems 202 can include any of a wide variety of different types of controllable subsystems on implement 110.

Operator interface system 204 can generate outputs that can be used to generate operator interfaces, such as visual, audible or haptic outputs to the operator. Operator interface system 204 can also be used to receive indications of operator interaction with operator interface mechanisms 172. It can provide indications of those interactions to systems and items on implement 110 as well.

Figure 3:
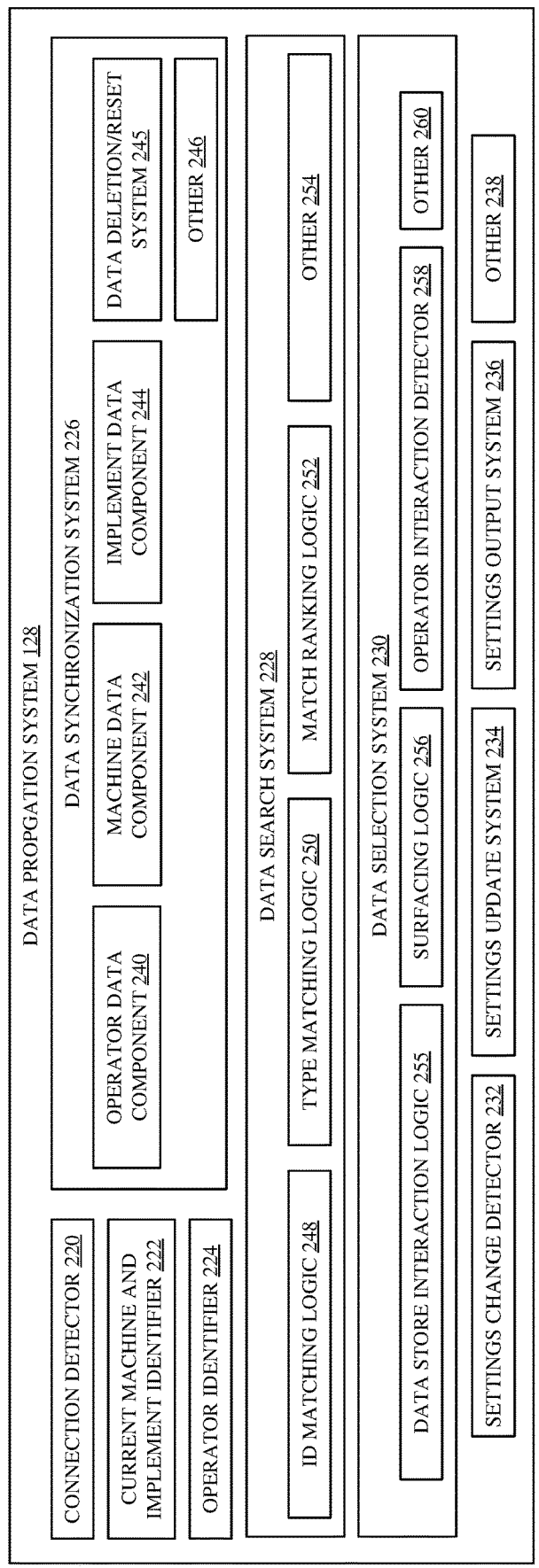
FIG. 3 is a block diagram showing one example of a data propagation system, in more detail.

FIG. 3 is a block diagram showing one example of data propagation system 128 in more detail. It will be appreciated that the data propagation systems 128, 130, 132, 152, 154 and 156 in FIG. 1 can be similar to one another, or different from one another. For instance, they can have the same systems and components, or some can have a subset of those systems and components. For the purposes of the present discussion, it will be assumed that they are all similar. Therefore, only data propagation system 128 is described in more detail. This is done by way of example only.

Data propagation system 128 illustratively includes connection detector 220, current machine and implement identifier 222, operator identifier 224, data synchronization system 226, data search system 228, data selection system 230, settings change detector 232, settings update system 234, settings output system 236, and it can include other items 238. Data synchronization system 226 can include operator data component 240, machine data component 242, implement data component 244, data detection/reset system 245, and it can include other items 246. Data search system 228 illustratively includes ID matching logic 248, type matching logic 250, match ranking logic 252, and it can include other items 254. Data selection system 230 can include data store interaction logic 255, surfacing logic 256, operator interaction detector 258, and it can include other items 260.

Before describing the overall operation of data propagation system 128 in more detail, a brief description of some of the items in data propagation system 128, and their operation, will first be provided. Connection detector 220 illustratively detects when machine 122 is connected to an implement 110. This can happen in a wide variety of different ways. It can provide a signal through link 170 and receive a signal indicating the connection. It can receive a signal from a connector indicating that it has been connected to a machine, or it can detect the connection in other ways.

Current machine and implement identifier 222 accesses the identifier information 116 in data store 186, identifying machine 104, and the type identifier 122 identifying the type of machine 104. It can communicate with implement 110 to access the unique identifier 140 and type identifier 146 on implement 110 as well. Operator identifier 224 illustratively receives information (e.g., through operator interface mechanisms 172) identifying the operator 110 who is operating machine 104. This may be provided, for instance, when operator 100 enters the operator compartment of machine 104 and begins to power up the machine. It can be automatically read from a mobile device or other identifying item carried by operator 100. It can be obtained in other ways as well.

Data synchronization system 226 then begins to synchronize all of the combination data stored on implement 110, with that stored on machine 104. It thus facilitates communication with data propagation system 152 on implement 110 to determine what combinations are identified and stored on implement 110. It can thus determine whether machine 104 has any additional combination data that should be provided to implement 110. It also communicates with data propagation system 152 to determine whether implement 110 has additional combination data that should be added to the combination data stored on machine 104.

Therefore, operator data component 240 determines whether any of the combination data stored on implement 110 has combinations with operators that are not stored on machine 104. Machine data component 242 determines whether any of the combination data on implement 110 is for machines, for which combination data is not stored on machine 104. Implement data component 244 determines whether the combination data on implement 110 includes combinations with implements, for which no corresponding combination data is stored on machine 104.

It may be that an operator or administrator or other user wishes to delete one or more combination records and remove them using synchronization system 226. In that case, data deletion/reset system 245 surfaces a user interface that allows the user to mark the record for deletion. The marked record can also be time stamped. Then, when that record is synchronized to other machines or implements, the deletion/reset system on that machine or implement can examine the time stamps to see that the record, marked for deletion, is more recent than the corresponding record, not marked for deletion. It can then mark the latter record for deletion and time stamp it, so the record will be marked for deletion on all other machines/implements it is synchronized to. The same can be done to reset the settings to default settings.

After data synchronization system 226 synchronizes the combination records 190 in machine 104 with the combination records 210 in implement 110, then data search system 228 searches the combination records 190 on machine 104 to determine whether the present combination (operator 100 operating machine 104 that is connected to implement 110) can be found in records 190. Thus, ID matching logic 248 determines whether the unique identifiers for machine 104 and implement 110, and the operator identifier match machine/implement/operator combination records 190. If so, this indicates that this precise combination (this particular operator 100 and this particular machine 104 and this particular implement 110) have been operated together before and the settings data during that operation were captured and stored in a combination record 190 in data store 186 on machine 104. In that case, the settings data for that combination record can be obtained by data selection system 230. Data store interaction logic 255 accesses data store 186 to obtain the settings data from the matching combination record 190 corresponding to the current combination of machine/implement/operator.

Surfacing logic 256 surfaces those settings for operator 100. Operator 100 can react in a number of different ways. This is detected by operator interaction detector 258. For instance, the operator can reject the surfaced settings. Alternatively, the operator can accept those settings, or react in other ways. If the operator accepts the settings, then settings output system 236 generates an output indicative of the settings that have been accepted by operator 100, to control/configuration system 180. System 180 generates control signals to control the controllable subsystems 182 on machine 104. System 180 can also provide outputs over link 170 to control the controllable subsystems 202 based upon the settings that have been accepted by operator 100.

Even if the operator accepts the settings, it may be that during the agricultural operation in the field, the operator changes the settings. This is detected by settings change detector 232. When the settings are changed, detector 232 provides an output indicating this to settings update system 234. Settings update system 234 then updates the settings corresponding to this combination record 190 in data store 186.

Returning again to the data search system 228, assume now that ID matching logic 248 has determined that there is no combination record 190 that precisely matches the current combination of operator, machine and implement. However, even if that is the case, there may be other relevant combination records 190 that can be used to suggest settings to operator 100. For instance, assume that operator 100 has never operated this particular machine 104 before. Assume further, though, that operator 100 has operated machine 106 when machine 106 was attached to implement 110. Therefore, assume that a combination record 190 is stored in data store 186 to reflect that combination. Type matching logic 250 will then detect that machine 106 is the same type of machine as machine 104, based upon the type indicators 124 and 122 for the two machines. Logic 250 may thus identify the combination record 190 for the combination of operator 100, machine 106 and implement 110 as a matching record.

This may be relevant to operator 100, because even though operator 100 has never operated this particular machine 104, operator 100 may be interested in the settings that he or she used when operating machine 106 (which is the same type of machine as machine 104) with implement 110. Thus, type matching logic 250 will use data store interaction logic 255 identify the record as a matching record. Logic 255 can determine whether any of the combination records 190 show a combination in which operator 100 operated a machine that is the same type as machine 104, with implement 110. It will output an indication of that match to data selection system 230, which can then obtain the settings data corresponding to that matched combination record and surface the settings data for operator 100.

Other logic 254 can also search for other relevant matches. For instance, it may be that there is no combination record for machine 104 and implement 110, with operator 100. However, it may be that operator 102 is a higher performing operator than operator 100, and it may also be that operator 102 has used machine 104 with implement 110, in the past. In that case, data store 186 will store a combination record 190 for the combination of operator 102, machine 104, and implement 110. Other searching logic 254 may identify that combination record as a potential match, because it is for the same machine 104 and implement 110, and for a higher performing operator 102.

In yet another example, it may be that there is no combination record 190 for the combination of machine 104 and implement 110. However, there may be a combination record 190 for machine 106 and implement 112. Type matching logic 250 will identify this combination record as a potential match, because machine 106 is of the same type as machine 104, and implement 112 is of the same type as implement 110. Data searching system 228 can identify these and other combination records as potential matching combination records.

The different matches may be more or less relevant to the present combination of machine/implement/operator. For instance, if ID matching logic 248 identifies a combination record 190 that precisely matches the present combination of operator 100, machine 104 and implement 110, this may be the most relevant match. However, if no such match exists, but type matching logic 250 identifies, as a matching record, a combination record for machine 106 (which is the same type as machine 104) and implement 110, this may be more relevant than a combination record for machine 106 and implement 112. Therefore, machine ranking logic 252 can be used to rank the matching combination records. A variety of different ranking algorithms can be used to preferentially rank the matches. For instance, it may be that the ranking algorithm ranks, as the highest match, an identical combination record 190 which corresponds to this particular operator 100 operating this particular machine 104 with this particular implement 110. It may be that it ranks, as a next highest ranking combination record, a combination record for this operator 100 using this machine 104, but with a different implement (e.g., implement 112). A next highest record may be a combination record for this operator 100, with a different machine 106 with the same implement 110. The particular ranking algorithm used by match ranking logic 252 to rank the various matching combination records 190 may vary based upon the types of machines being used, the types of implements being used, the industry, etc.

Data search system 228 illustratively provides an indication of the highest ranking combination record 190 to data selection system 230. Data store interaction logic 255 then proceeds to obtain the settings data corresponding to that record 190 from data store 186.

Figure 4A:
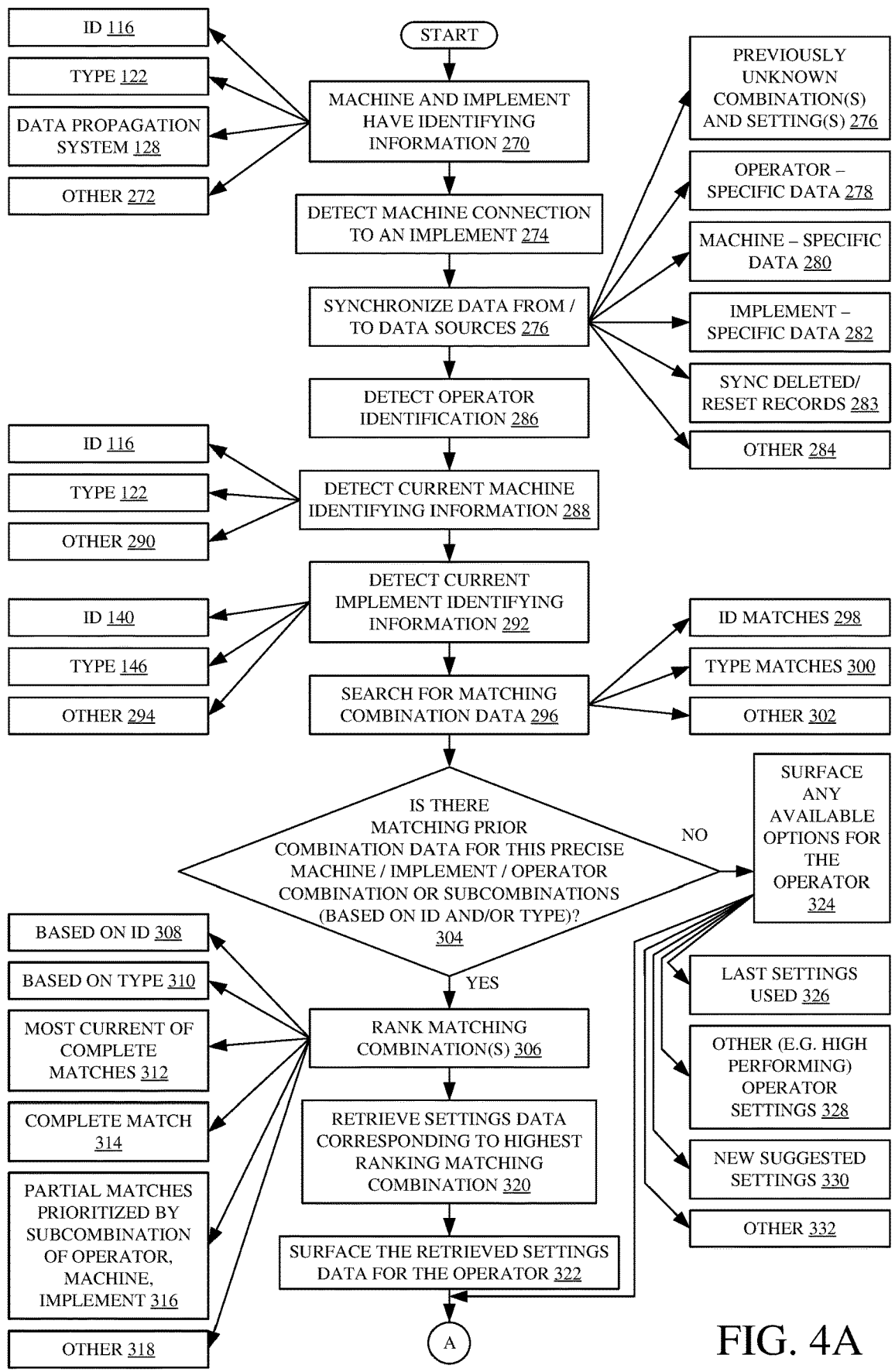
FIGS. 4A and 4B (collectively referred to herein as FIG. 4) show a flow diagram illustrating one example of the operation of a data propagation system.
Figure 4B:
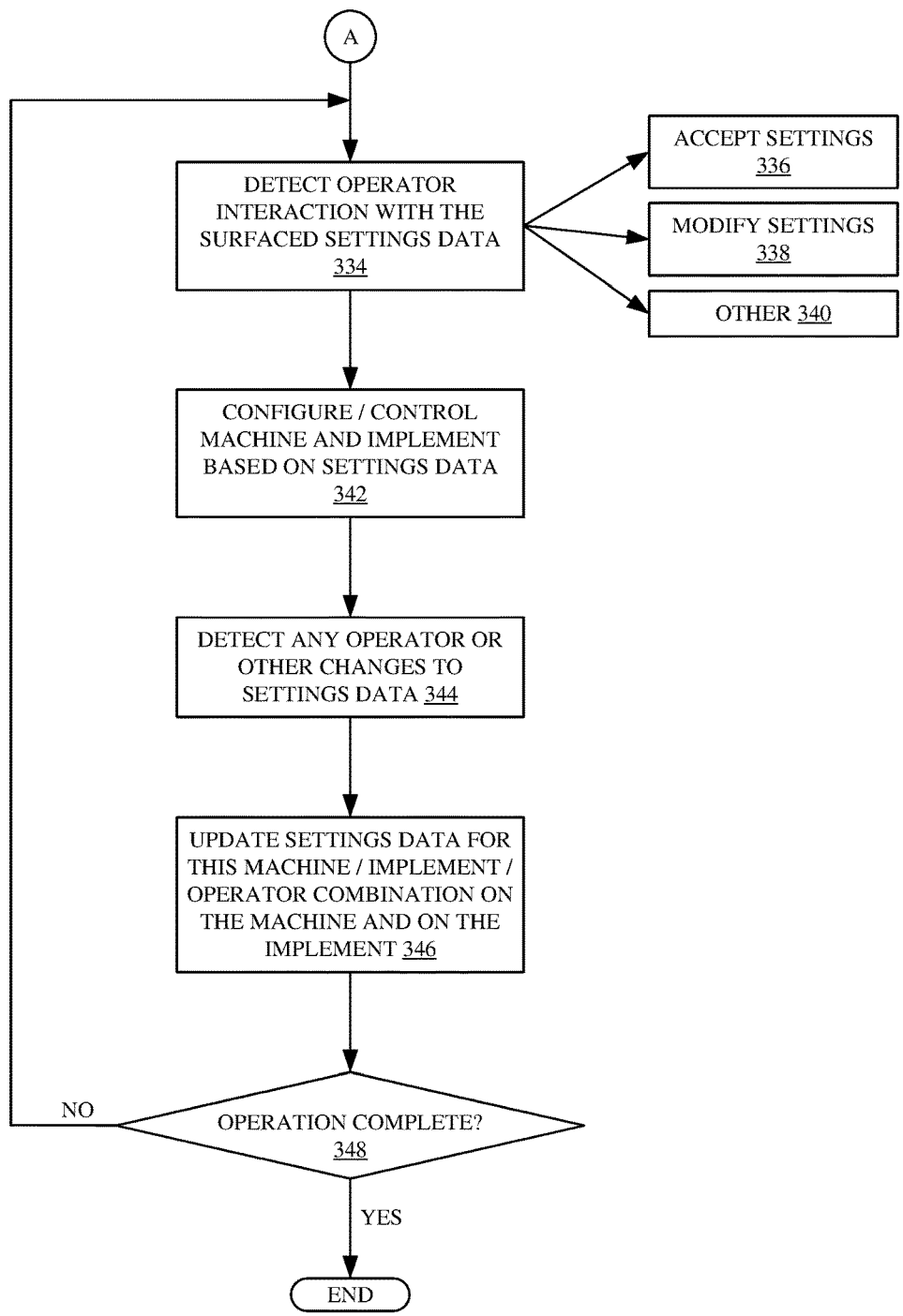

FIGS. 4A and 4B (collectively referred to herein as FIG. 4) show a flow diagram illustrating one example of the operation of data propagation system 128 in synchronizing data between machine 104 and implement 110, and obtaining the most relevant matching combination record 190 from data store 186 to use in outputting settings for machine 104 and implement 110. It is first assumed that machine 104 and implement 110 both have identifying information. This is indicated by block 270 in the flow diagram of FIG. 4. This illustratively includes the unique identifier 116, the type identifier 122, as well as data propagation system 128, and it can include other information 272 as well.

Connection detector 220 then detects that machine 104 is connected to an implement—in this example, implement 110. Detecting connection to an implement is indicated by block 274 in the flow diagram of FIG. 4.

Data synchronization system 226 then synchronizes data from and to the data sources (e.g., it synchronizes combination records 190 from data store 186 to data store 206 and it synchronizes combination records 210 from data store 206 back to data store 186). Synchronizing the data from these sources is indicated by block 276. As discussed above, data synchronization system 226 synchronizes previously unknown combination records 190 between the two machines. Thus, records 210 that were previously unknown by machine 104 are synchronized from implement 110. Records 190 that were previously unknown on implement 110 are synchronized from machine 104. This is indicated by block 277. Operator data component 240 identifies combination records 190 that are to be synchronized based upon the operator identification (e.g., a new combination for this operator). Machine data component 242 identifies combination records 190 that are to be synchronized based upon the machines that are identified in the combinations, and implement data component 244 identifies combination records 190 that are to be synchronized based upon the implements identified in the combinations. Synchronizing based on operator-specific combination data is indicated by block 278. Synchronizing based on machine-specific combination data is indicated by block 280 and synchronizing based on implement-specific combination data is indicated by block 282. Also, data deletion/reset system 245 also synchronizes any record deletion or reset data as discussed above. This is indicated by block 283. The synchronization can be performed in other ways as well, and this is indicated by block 284.

Operator identifier 224 also detects operator identification information. This is indicated by block 286. The identification information may be automatically read from a device carried by the operator, or it may be input by the operator, etc.

Current machine and implement identifier 222 accesses the machine and implement identifying information. Detecting the current machine identifying information is indicated by block 288. This can include the machine ID 116, the machine type identifier 122, or other identifying information 290. Detecting the current implement identifying information is indicated by block 292 in the flow diagram of FIG. 4. This can include the implement ID 140, the implement type identifier 146, and/or other identifying information 294.

Data search system 228 then searches for matching combination records 190. This is indicated by block 296 in the flow diagram of FIG. 4. As discussed above with respect to FIG. 3, ID matching logic 248 can identify combination records 190 that match the current combination of operator/machine/implement based upon the operator identifiers, machine ID 116, and implement ID 140. This is indicated by block 298. Type matching logic 250 can identify matches based upon the machine type identifier 122, and the implement type identifier 146. This is indicated by block 300. Also, as discussed elsewhere, matching combination records can be identified in other ways as well. This is indicated by block 302.

If there are any matching combination records 190 found for this precise machine/implement/operator combination or for sub-combinations (e.g., for this particular operator and machine but with a different implement of the same type, for a different operator but this machine and implement, etc.), then this is detected by match ranking logic 252, and it is indicated by block 304 in the flow diagram of FIG. 4.

Match ranking logic 252 ranks the plurality of matching combination records, using a ranking algorithm, based on the relevance of the combination records to the current combination. This is indicated by block 306. As mentioned above, the matching combination records 190 can be ranked based on the identifying information for the operator, machine and implement. This is indicated by block 308. The matching combination records 190 can be ranked based on the type indicator as indicated by block 310. The matching combination records 190 can be ranked based on recency, so that more recent matching combination records are ranked higher, as indicated by block 312. The matching algorithm can rank the matching combination records based on whether there is a complete match as indicated by block 314 or whether there are partial matches. The partial matches can be prioritized by different sub-combinations of the operator, machine and implement. This is indicated by block 316. The matching combination records can be ranked in other ways as well, as indicated by block 318.

The output of match ranking logic 252 is provided to data selection system 230 where data store interaction logic 255 retrieves the settings data corresponding to the highest ranking matching combination record 190. This is indicated by block 320 in the flow diagram of FIG. 4. That settings data is then surfaced for operator 100. It can be surfaced using surfacing logic 256, or in other ways. This is indicated by block 322.

Returning again to block 304, if there are no matching combination records 190, then this is indicated to data selection system 230 and surfacing logic 256 illustratively surfaces any available options for operator 100. This is indicated by block 324. This can include such things as data showing the last settings used by operator 100 on any type of machine, if those are available. This is indicated by block 326. It can include the settings that may have been used by other, high performing operators using other machines or implements. This is indicated by block 328. It can use new or default settings, as indicated by block 330, and it can surface other settings as indicated by block 332.

Whichever settings are surfaced for operator 100, operator interaction detector 258 illustratively detects any operator interaction with the surfaced settings. This is indicated by block 334 in the flow diagram of FIG. 4. For instance, the operator can provide an input indicating that the operator accepts the settings. This is indicated by block 336. The operator can provide an input accepting, but modifying the settings as indicated by block 338. The operator can reject the settings or interact with the surfaced settings in other ways as well, and this is indicated by block 340.

Settings output system 236 then outputs the settings to control/configuration system 180. System 180 generates control signals and provides them to the controllable subsystem 182 and/or any controllable subsystems 202 on implement 110. Configuring and/or controlling the machine 104 and implement 110 based on the settings data is indicated by block 342 in the flow diagram of FIG. 4.

During the operation of machine 104, settings change detector 232 can detect any operator changes to the settings. This is indicated by block 344. Settings update system 234 then updates the settings data for this machine/implement/operator combination record 190 in data store 186. It also outputs the update to update the corresponding machine/implement/operator combination record 210 in data store 206 on implement 110. This is indicated by block 346 in the flow diagram of FIG. 4. In this way, both the machine 104 and implement 110 will have the most up-to-date settings data corresponding to this combination of machine/implement/operator.

Until the operation is complete, processing reverts to block 344. This is indicated by block 348 in the flow diagram of FIG. 4.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 5:
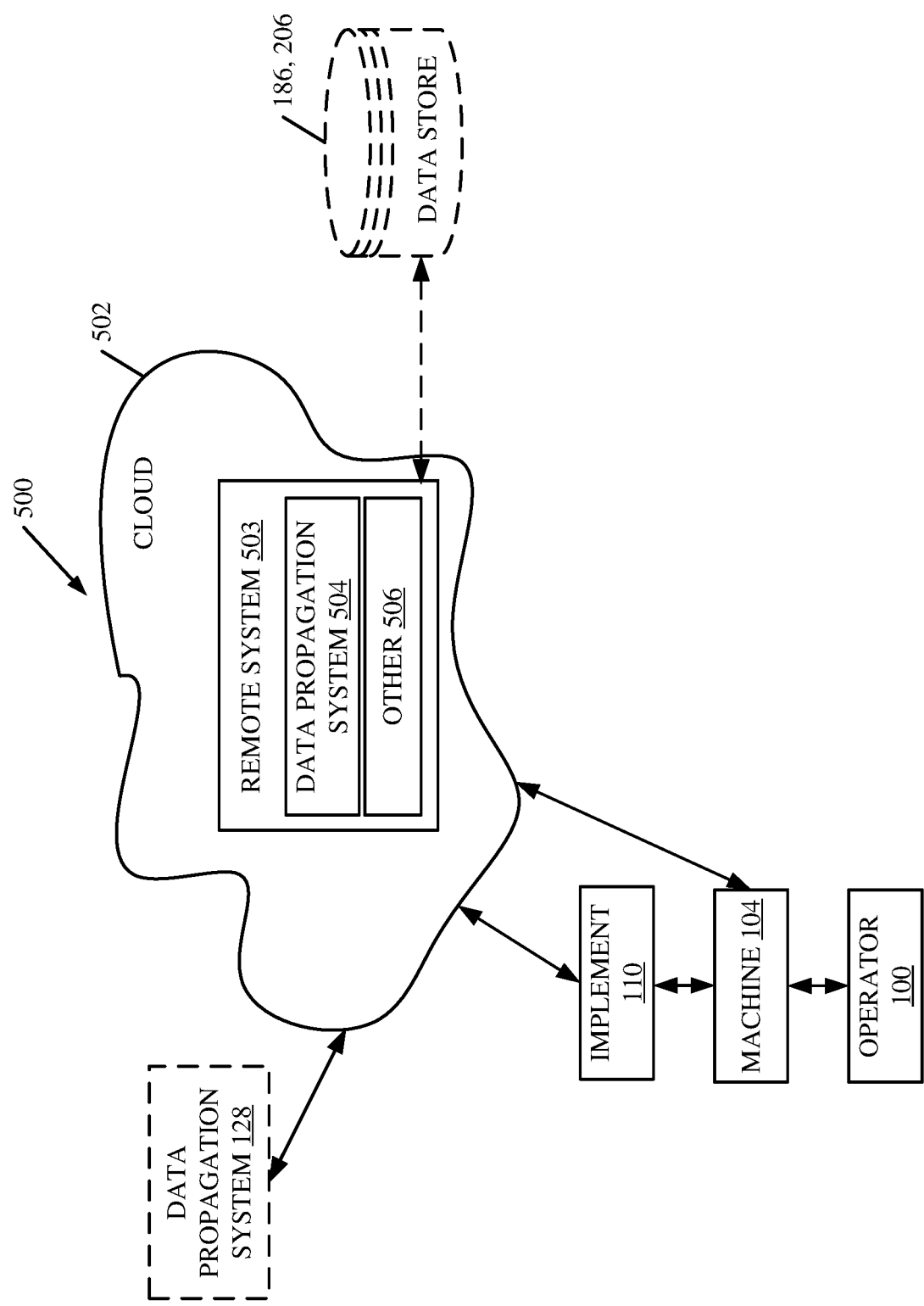
FIG. 5 shows one example of the machines and implements shown in FIG. 1, deployed in a remote server architecture.

FIG. 5 is a block diagram of operator 100, machine 104, and implement 110 shown in FIG. 2, except that communication is with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 2 and 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIGS. 2 and 3 and they are similarly numbered. FIG. 5 specifically shows that remote system 503 can have a data propagation system 504 and other items 506. Therefore, machine 104 and/or implement 110 can access those systems through remote server location 502.

FIG. 5 also depicts another example of a remote server architecture. FIG. 5 shows that it is also contemplated that some elements of FIGS. 2 and 3 are disposed at remote server location 502 while others are not. By way of example, data stores 186, 206 or data propagation system 128 can be disposed at a location separate from location 502, and accessed through the remote server at location 502. Regardless of where they are located, they can be accessed directly by machine 104 or implement 110, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine 104, implement 110 come close to the fuel truck for fueling, the system automatically collects the information from the machine/implement using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine/implement until the machine/implement enters a covered location. The machine/implement, itself, can then send the information to the main network.

It will also be noted that the elements of FIGS. 2 and 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
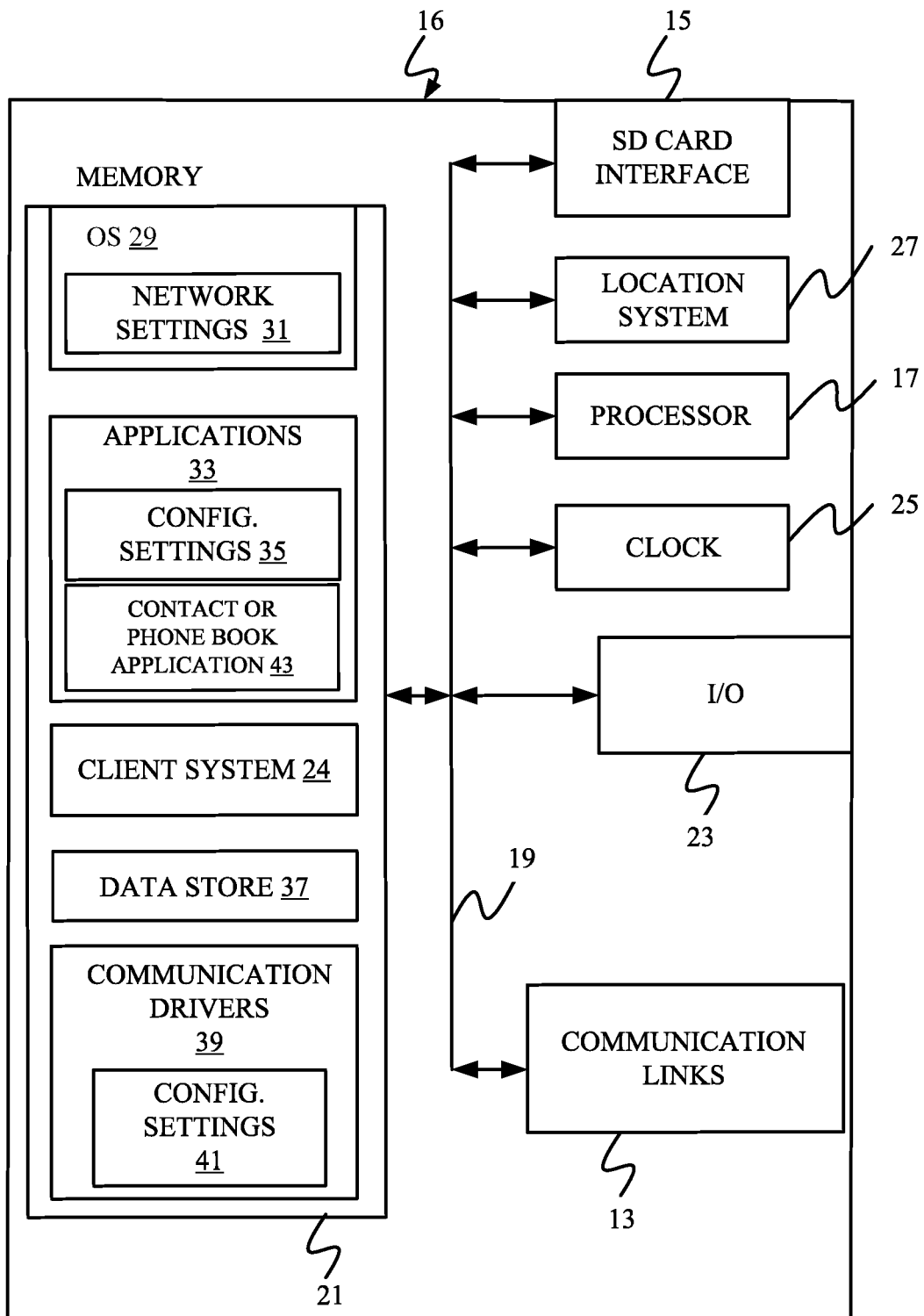
FIGS. 6-8 show examples of mobile devices that can be used in the architectures shown in the previous FIGS.
Figure 7:
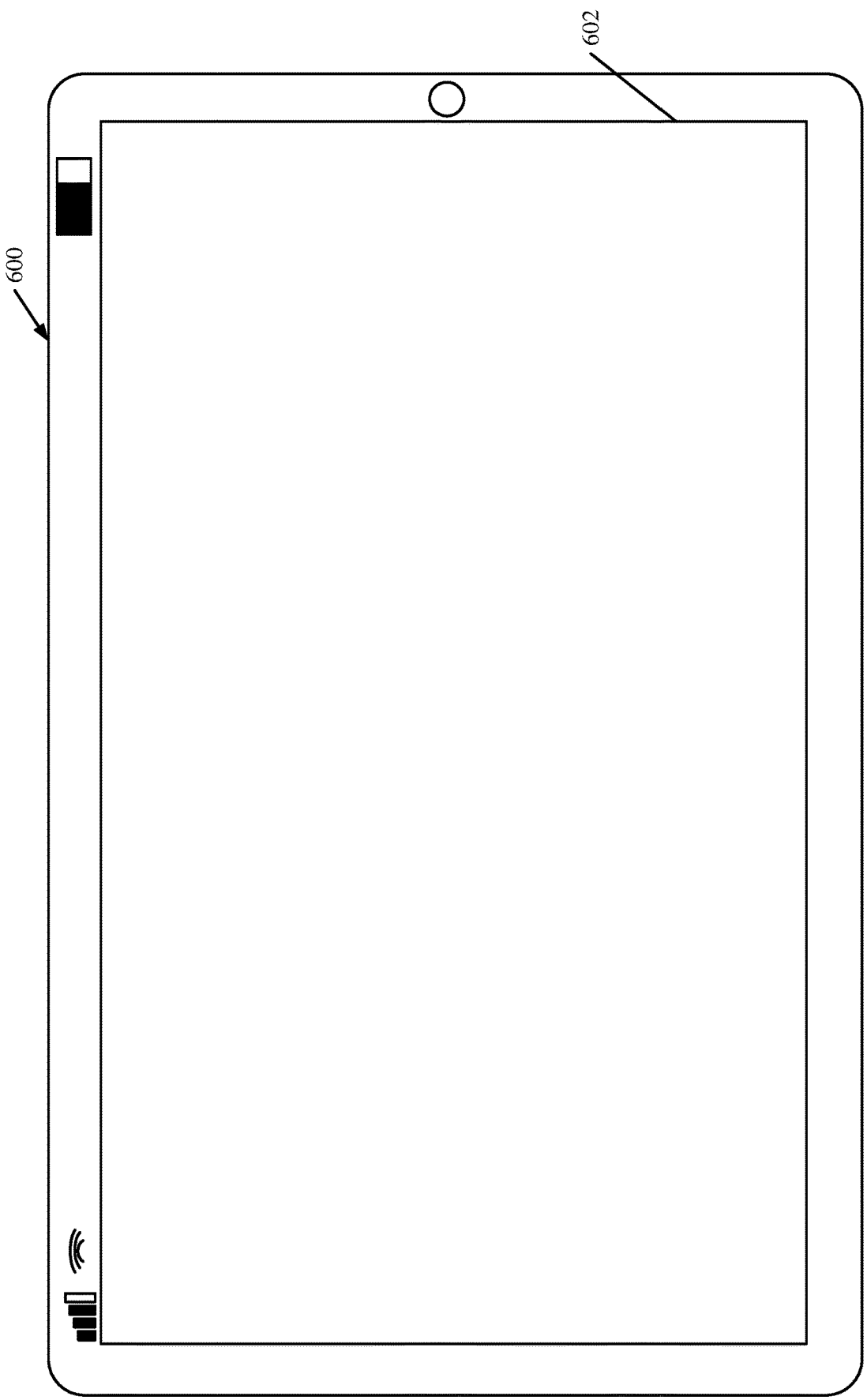
Figure 8:
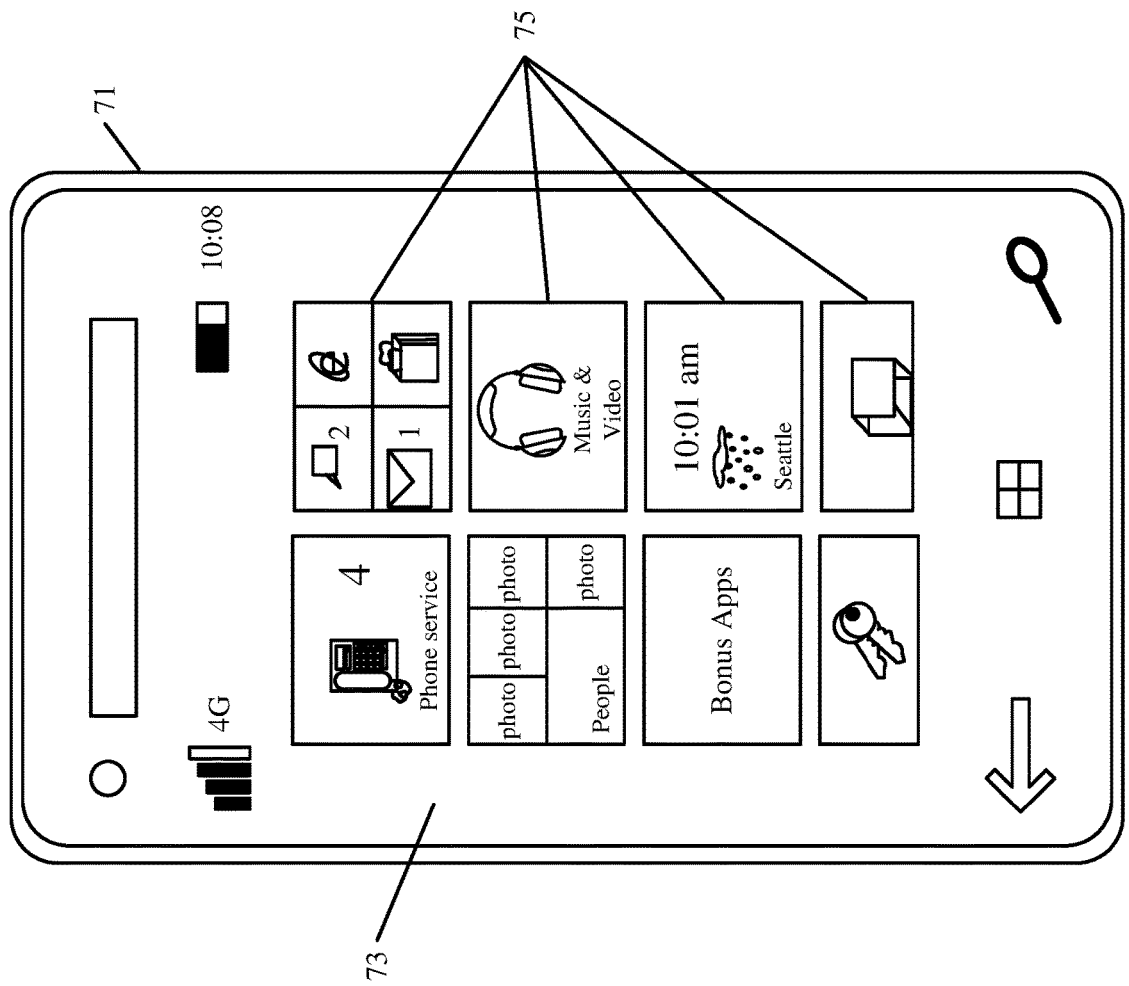

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 104 for use in generating, processing, or displaying the configuration/settings data. FIGS. 7-8 are examples of handheld or mobile devices.

FIG. 6 provides a general block diagram of the components of a client device 16 that can run some components shown in FIGS. 2 and 3, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also be processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
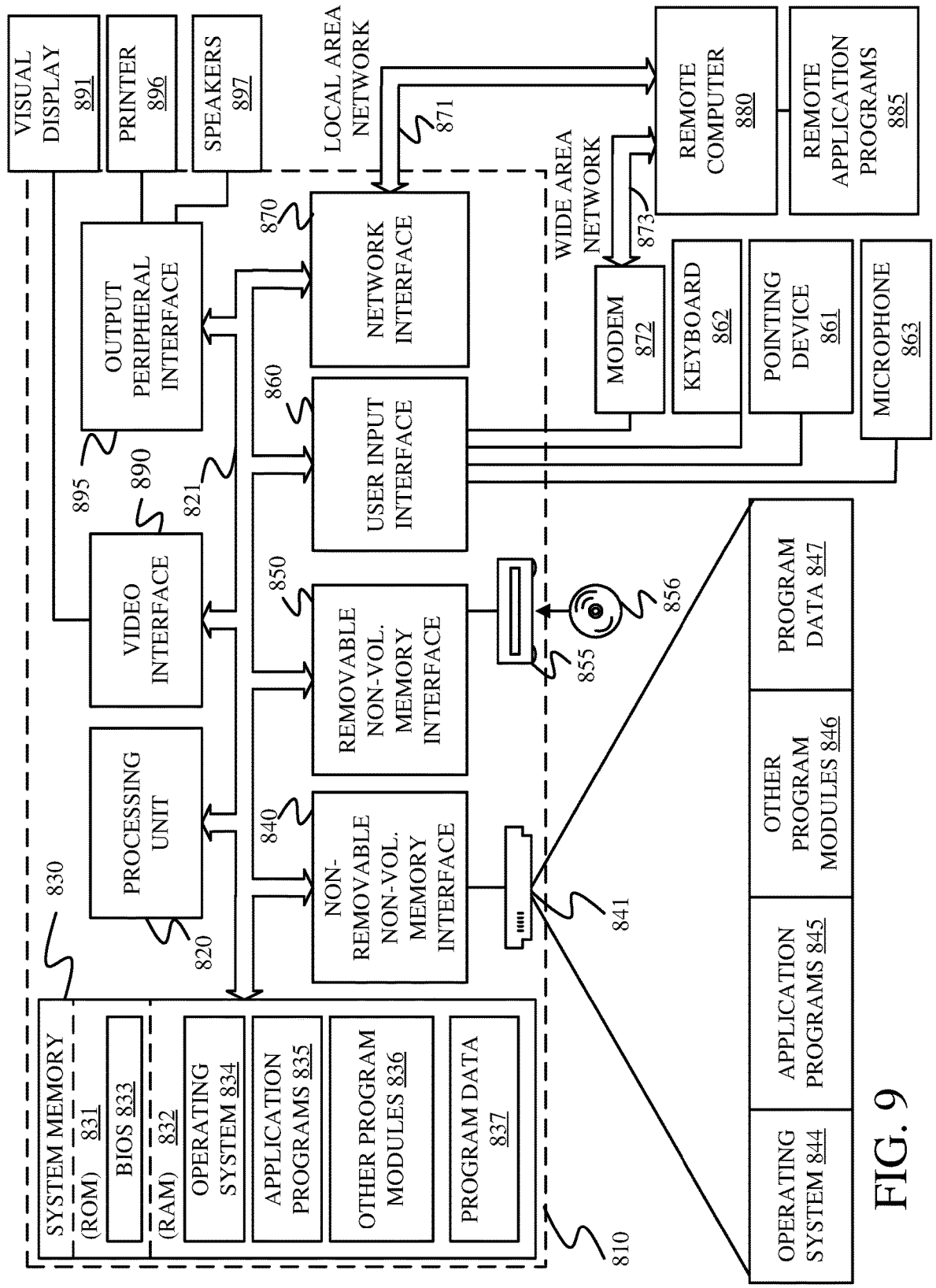
FIG. 9 is a block diagram showing one example of a computing environment that can be used in the architectures shown in the previous FIGS.

FIG. 9 is one example of a computing environment in which elements of FIG. 2 or 3, or parts of it, (for example) can be deployed. With reference to FIG. 9, an example system for implementing some embodiments includes a general-purpose computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 2 and/or 3 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural equipment control system, comprising:

a data store that stores data records, each data record including a set of settings data that identifies machine settings corresponding to an operator/machine/implement combination;

a connection detector that detects connection of a particular agricultural machine, being operated by a particular operator, to a particular implement and generates a connection signal based on the detected connection;

a data synchronization system that receives the connection signal and identifies data records to be synchronized between the agricultural machine and the implement and that synchronizes the identified data records;

a data search system that searches the data store to identify a matching data record corresponding to a combination of the particular operator, the particular machine and the particular implement;

a data selection system that obtains the set of settings data corresponding to the matching data record; and a control system that controls the agricultural equipment based on the set of settings data corresponding to the matching data record.

Example 2 is the agricultural equipment control system of any or all previous examples wherein the data selection system comprises:

surfacing logic configured to surface the set of settings data corresponding to the matching data record for operator interaction.

Example 3 is the agricultural equipment control system of any or all previous examples wherein the data selection system comprises:

operator interaction detector that detects operator interaction with the surfaced set of settings data corresponding to the matching data record for operator interaction.

Example 4 is the agricultural equipment control system of any or all previous examples wherein the operator interaction detector is configured to detect an operator acceptance input accepting the set of settings data corresponding to the matching data record, and wherein the control system is configured to generate a control signal to control a controllable subsystem based on the set of settings data corresponding to the matching data record and based on the operator acceptance input.

Example 5 is the agricultural equipment control system of any or all previous examples wherein the operator interaction detector is configured to detect an operator modification input modifying the set of settings data corresponding to the matching data record, and wherein the control system is configured to generate a control signal to control the controllable subsystem based on the modified set of settings data.

Example 6 is the agricultural equipment control system of any or all previous examples and further comprising:

a settings update system that updates the matching data record based on the modified set of settings data.

Example 7 is the agricultural equipment control system of any or all previous examples wherein the data search system is configured to identify a plurality of different potential matching data records and further comprising:

match ranking logic configured to rank the plurality of different potential matching data records to identify a most relevant matching data record, based on the combination of the particular operator, the particular machine and the particular implement, as the matching data record.

Example 8 is the agricultural equipment control system of any or all previous examples wherein the particular operator has a particular operator identifier (operator ID), particular machine has a particular machine identifier (machine ID) and a machine type and wherein the particular implement has a particular implement identifier (implement ID) and an implement type and wherein the data search system comprises:

ID matching logic configured to identify the potential matching data records based on the operator ID, the machine ID and the implement ID.

Example 9 is the agricultural equipment control system of any or all previous examples wherein the data search system comprises:

type matching logic configured to identify the potential matching data records based on the operator ID, the machine type and the implement type.

Example 10 is the agricultural equipment control system of any or all previous examples wherein the agricultural equipment control system is disposed on the particular implement.

Example 11 is the agricultural equipment control system of any or all previous examples wherein the agricultural equipment control system is disposed on the machine.

Example 12 is the agricultural equipment control system of any or all previous examples wherein the data store is disposed in a remote server environment.

Example 13 is a computer implemented method of controlling a piece of agricultural equipment, comprising:

storing data records, each data record including a set of settings data that identifies machine settings corresponding to an operator/machine/implement combination;

detecting connection of a particular agricultural machine, being operated by a particular operator, to a particular implement;

generating a connection signal based on the detected connection;

identifying, based on the connection signal, data records to be synchronized between the agricultural machine and the implement;

synchronizing the identified data records;

searching the data store to identify a matching data record corresponding to a combination of the particular operator, the particular machine and the particular implement;

obtains the set of settings data corresponding to the matching data record; and controlling the agricultural equipment based on the set of settings data corresponding to the matching data record.

Example 14 is the computer implemented method of any or all previous examples wherein controlling the agricultural equipment based on the set of settings data comprises:

surfacing the set of settings data corresponding to the matching data record for operator interaction; and detecting operator interaction with the surfaced set of settings data corresponding to the matching data record for user interaction.

Example 15 is the computer implemented method of any or all previous examples wherein detecting operator interaction comprises detecting an operator acceptance input accepting the set of settings data corresponding to the matching data record, and wherein controlling the agricultural equipment comprises generating a control signal to control a controllable subsystem based on the set of settings data corresponding to the matching data record and based on the operator acceptance input.

Example 16 is the computer implemented method of any or all previous examples wherein detecting operator interaction comprises detecting an operator modification input modifying the set of settings data corresponding to the matching data record, and wherein controlling the agricultural equipment comprises generating a control signal to control the controllable subsystem based on the modified set of settings data, and updating the matching data record based on the modified set of settings data.

Example 17 is the computer implemented method of any or all previous examples wherein searching the data store to identify a matching data record comprises:

identifying a plurality of different potential matching data records; and ranking the plurality of different potential matching data records to identify a most relevant matching data record, based on the combination of the particular operator, the particular machine and the particular implement, as the matching data record.

Example 18 is the computer implemented method of any or all previous examples wherein the particular operator has a particular operator identifier (operator ID), particular machine has a particular machine identifier (machine ID) and a machine type and wherein the particular implement has a particular implement identifier (implement ID) and an implement type and wherein searching the data store to identify a matching data record comprises:

identifying the potential matching data records based on the operator ID, the machine ID and the implement ID; and identifying the potential matching data records based on the operator ID, the machine type and the implement type.

Example 19 is an agricultural equipment control system, comprising:

at least one processor; and a data store storing data records, each data record including a set of settings data that identifies machine settings corresponding to an operator/machine/implement combination, and storing instructions which, when executed by the at least one processor, cause the at least one processor to perform steps of:

detecting connection of a particular agricultural machine, being operated by a particular operator, to a particular implement;

generating a connection signal based on the detected connection;

identifying, based on the connection signal, data records to be synchronized between the agricultural machine and the implement;

synchronizing the identified data records;

searching the data store to identify a matching data record corresponding to a combination of the particular operator, the particular machine and the particular implement;

obtains the set of settings data corresponding to the matching data record; and controlling the agricultural equipment based on the set of settings data corresponding to the matching data record.

Example 20 is the agricultural equipment control system of any or all previous examples wherein the particular operator has a particular operator identifier (operator ID), particular machine has a particular machine identifier (machine ID) and a machine type and wherein the particular implement has a particular implement identifier (implement ID) and an implement type and wherein searching the data store to identify a matching data record comprises:

identifying a plurality of potential matching data records based on the operator ID, the machine ID and the implement ID;

identifying the plurality of potential matching data records based on the operator ID, the machine type and the implement type; and ranking the plurality of different potential matching data records to identify a most relevant matching data record, based on the combination of the particular operator, the particular machine and the particular implement, as the matching data record.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural equipment control system comprising:
a first data store, of a particular implement, configured to store a first set of data records, each data record, in the first set of data records, including a set of settings data that identifies machine settings corresponding to a particular operator/particular machine/particular implement combination;
a second data store, of a particular machine, configured to store a second set of data records, each data record, in the second set of data records, including a set of settings data that identifies machine settings corresponding to a particular operator/particular machine/particular implement combination;
a connection detector configured to detect connection of the particular machine, being operated by a particular operator, to the particular implement and generates a connection signal based on the detected connection;
a data synchronization system configured to, based on the connection signal, identify one or more data records from the first set of data records missing from the second set of data records and to identify one or more data records from the second set of data records missing from the first set of data records and to synchronize the first data store by uploading the one or more data records from the second set of data records to the first data store and to synchronize the second data store by uploading the one or more data records from the first set of data records to the second data store;
a data search system configured to search the synchronized second data store to identify a matching data record corresponding to a combination of the particular operator, the particular machine and the particular implement;
a data selection system configured to obtain the set of settings data corresponding to the matching data record; and
a control system configured to control the agricultural equipment based on the set of settings data corresponding to the matching data record.

2. The agricultural equipment control system of claim 1, wherein the data selection system comprises:
surfacing logic configured to surface the set of settings data corresponding to the matching data record for operator interaction.

3. The agricultural equipment control system of claim 2, wherein the data selection system comprises:
operator interaction detector configured to detect operator interaction with the surfaced set of settings data corresponding to the matching data record for operator interaction.

4. The agricultural equipment control system of claim 3, wherein the operator interaction detector is configured to detect an operator acceptance input accepting the set of settings data corresponding to the matching data record, and wherein the control system is configured to generate a control signal to control a controllable subsystem based on the set of settings data corresponding to the matching data record and based on the operator acceptance input.

5. The agricultural equipment control system of claim 4, wherein the operator interaction detector is configured to detect an operator modification input modifying the set of settings data corresponding to the matching data record, and wherein the control system is configured to generate a control signal to control the controllable subsystem based on the modified set of settings data.

6. The agricultural equipment control system of claim 5 and further comprising:
a settings update system configured to update the matching data record based on the modified set of settings data.

7. The agricultural equipment control system of claim 1, wherein, when no matching data record corresponding to the combination of the particular operator, the particular machine, and the particular implement is found, the data search system is configured to identify a plurality of different potential matching data records and further comprising:
match ranking logic configured to rank the plurality of different potential matching data records to identify, as the matching data record, a most relevant matching data record, based on the combination of the particular operator, the particular machine and the particular implement, each different potential matching data record corresponding to a different operator.

8. The agricultural equipment control system of claim 7, wherein the particular operator has a particular operator identifier (operator ID), the particular machine has a machine type, and the particular implement has an implement type and wherein the data search system comprises:
type matching logic configured to identify the most relevant matching data record based on the operator ID, the machine type and the implement type.

9. The agricultural equipment control system of claim 1, wherein the particular operator has a particular operator identifier (operator ID), the particular machine has a particular machine identifier (machine ID) and wherein the particular implement has a particular implement identifier (implement ID) and wherein the data search system comprises:
ID matching logic configured to identify the matching data record based on the operator ID, the machine ID and the implement ID.

10. The agricultural equipment control system of claim 1, wherein the agricultural equipment control system is disposed on the particular implement.

11. The agricultural equipment control system of claim 1, wherein the agricultural equipment control system is disposed on the machine.

12. The agricultural equipment control system of claim 1, wherein one or more of the first data store and the second data store are disposed in a remote server environment.

13. A computer implemented method of controlling a piece of agricultural equipment, the computer implemented method comprising:
storing data records, each data record including a set of settings data that identifies machine settings corresponding to a particular operator/particular machine/particular implement combination;
detecting connection of a particular agricultural machine, being operated by a particular operator, to a particular implement;
generating a connection signal based on the detected connection;
identifying, based on the connection signal, data records of a first data store on the implement to be synchronized with the agricultural machine and data records of a second data store on the agricultural machine to be synchronized with the implement;
synchronizing the identified data records;
searching one of the first data store or the second data store to identify a matching data record corresponding to a combination of the particular operator, the particular machine and the particular implement;
obtaining the set of settings data corresponding to the matching data record; and
controlling the agricultural equipment based on the set of settings data corresponding to the matching data record.

14. The computer implemented method of claim 13, wherein controlling the agricultural equipment based on the set of settings data comprises:
surfacing the set of settings data corresponding to the matching data record for operator interaction; and
detecting operator interaction with the surfaced set of settings data corresponding to the matching data record for user interaction.

15. The computer implemented method of claim 14, wherein detecting operator interaction comprises detecting an operator acceptance input accepting the set of settings data corresponding to the matching data record, and wherein controlling the agricultural equipment comprises generating a control signal to control a controllable subsystem based on the set of settings data corresponding to the matching data record and based on the operator acceptance input.

16. The computer implemented method of claim 15, wherein detecting operator interaction comprises detecting an operator modification input modifying the set of settings data corresponding to the matching data record, and wherein controlling the agricultural equipment comprises generating a control signal to control the controllable subsystem based on the modified set of settings data, and updating the matching data record based on the modified set of settings data.

17. The computer implemented method of claim 13, wherein searching the data store to identify a matching data record comprises:
identifying a plurality of different potential matching data records; and
ranking the plurality of different potential matching data records to identify a most relevant matching data record, based on the combination of the particular operator, the particular machine and the particular implement, as the matching data record.

18. The computer implemented method of claim 17, wherein the particular operator has a particular operator identifier (operator ID), particular machine has a particular machine identifier (machine ID) and a machine type and wherein the particular implement has a particular implement identifier (implement ID) and an implement type and wherein searching the data store to identify a matching data record comprises:
identifying the potential matching data records based on the operator ID, the machine ID and the implement ID; and
identifying the potential matching data records based on the operator ID, the machine type and the implement type.

19. An agricultural system comprising:
a data store, on a particular implement, configured to store data records, each data record including a set of settings data that identifies machine settings corresponding to a particular operator/particular machine/particular implement combination; and
at least one processor, separate from the particular implement, configured to:
detect connection of the particular agricultural machine having a particular machine identifier (machine ID), being operated by a particular operator having a particular operator identifier (operator ID), to a particular implement having a particular implement identifier (implement ID);
generate a connection signal based on the detected connection;
search, over a wired communication link, the data store to identify a matching data record corresponding to a combination of the particular operator, the particular machine and the particular implement based on the operator ID, the machine ID, and the implement ID;
obtain the set of settings data corresponding to the matching data record; and
control agricultural equipment based on the set of settings data corresponding to the matching data record.

20. The agricultural system of claim 19, wherein the wired communication link comprises a controller area network (CAN).

* * * * *